United States Patent
Bourgault et al.

(10) Patent No.: US 10,149,427 B2
(45) Date of Patent: Dec. 11, 2018

(54) AIR SEEDER DISTRIBUTION APPARATUS WITH PURGING AIR

(71) Applicant: Bourgault Industries Ltd., St. Brieux (CA)

(72) Inventors: Gerard Bourgault, St. Brieux (CA); Mark Cresswell, St. Brieux (CA); Scot Jagow, St. Brieux (CA)

(73) Assignee: Bourgault Industries Ltd., Saskatchewan (CA)

( * ) Notice: Subject to any disclaimer, the term of this patent is extended or adjusted under 35 U.S.C. 154(b) by 6 days.

(21) Appl. No.: 15/441,287

(22) Filed: Feb. 24, 2017

(65) Prior Publication Data

US 2018/0124996 A1   May 10, 2018

(30) Foreign Application Priority Data

Nov. 4, 2016   (CA) ...................... 2947428

(51) Int. Cl.
*A01C 7/20*   (2006.01)
*A01C 7/08*   (2006.01)
*A01B 49/06*   (2006.01)

(52) U.S. Cl.
CPC .............. *A01C 7/082* (2013.01); *A01B 49/06* (2013.01); *A01C 7/081* (2013.01); *A01C 7/206* (2013.01)

(58) Field of Classification Search
CPC .. A01C 7/08; A01C 7/20; A01C 7/082; A01C 7/084; A01C 7/081; A01B 49/06
USPC .................................................. 111/174–176
See application file for complete search history.

(56) References Cited

U.S. PATENT DOCUMENTS

| | | | |
|---|---|---|---|
| 7,395,769 B2 * | 7/2008 | Jensen ..................... | A01C 7/00 111/121 |
| 7,555,990 B2 * | 7/2009 | Beaujot ................... | A01C 7/084 111/123 |
| 7,690,440 B2 | 4/2010 | Dean et al. | |
| 8,635,963 B2 | 1/2014 | Friggstad | |
| 8,690,488 B2 * | 4/2014 | Jagow ..................... | A01C 7/082 111/175 |
| 8,821,078 B2 * | 9/2014 | Hockett ............... | B65G 47/684 111/175 |
| 8,955,445 B2 * | 2/2015 | Riffel ..................... | A01C 7/084 111/175 |
| 9,826,676 B2 * | 11/2017 | Borkgren ............... | A01C 7/042 |
| 2007/0022928 A1 * | 2/2007 | Kowalchuk ............ | A01C 7/082 111/175 |

(Continued)

*Primary Examiner* — John Weiss
(74) *Attorney, Agent, or Firm* — Frost Brown Todd LLC

(57) ABSTRACT

An air seeder distribution apparatus has a manifold and a plurality of delivery conduit connected to ports of the manifold. A supply conduit carries a product air stream and is connected the manifold interior. A port valve when open connects a delivery conduit to the manifold interior through the port and disconnects same when closed. A purging conduit connects the supply conduit, at a clean air location configured to receive from the supply conduit a clean air stream with no agricultural products entrained therein, to the delivery conduit such that the clean air stream has an open path from the supply conduit to the delivery conduit. When the port valve is open the clean air stream flows through the purging conduit at a low first flow rate, and when the port valve is closed the clean air stream flows through the purging conduit at a second significantly greater flow rate.

4 Claims, 2 Drawing Sheets

(56) References Cited

U.S. PATENT DOCUMENTS

Figure 1:
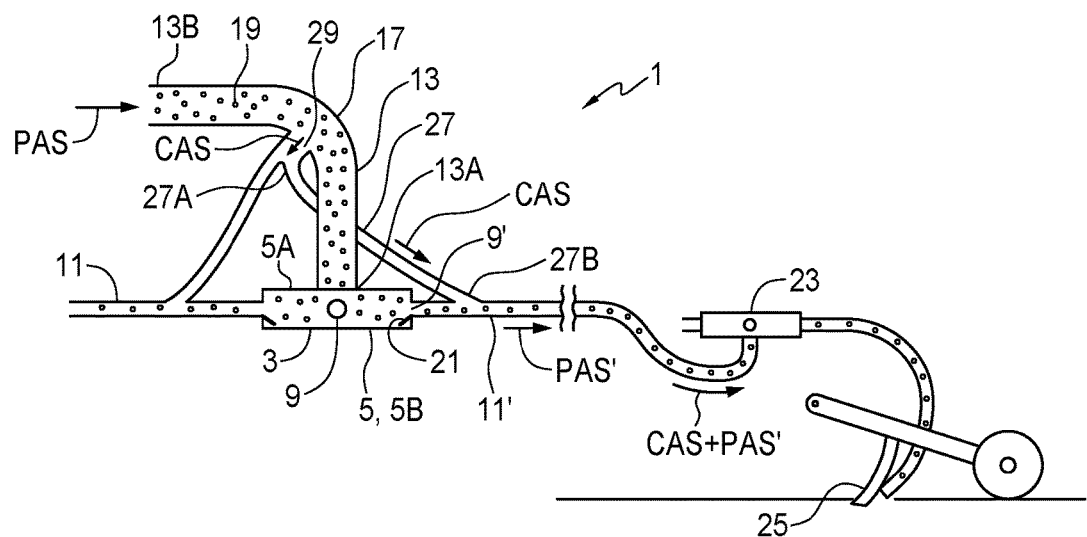

2008/0121154 A1* 5/2008 Memory ................ A01C 7/082
111/174

* cited by examiner

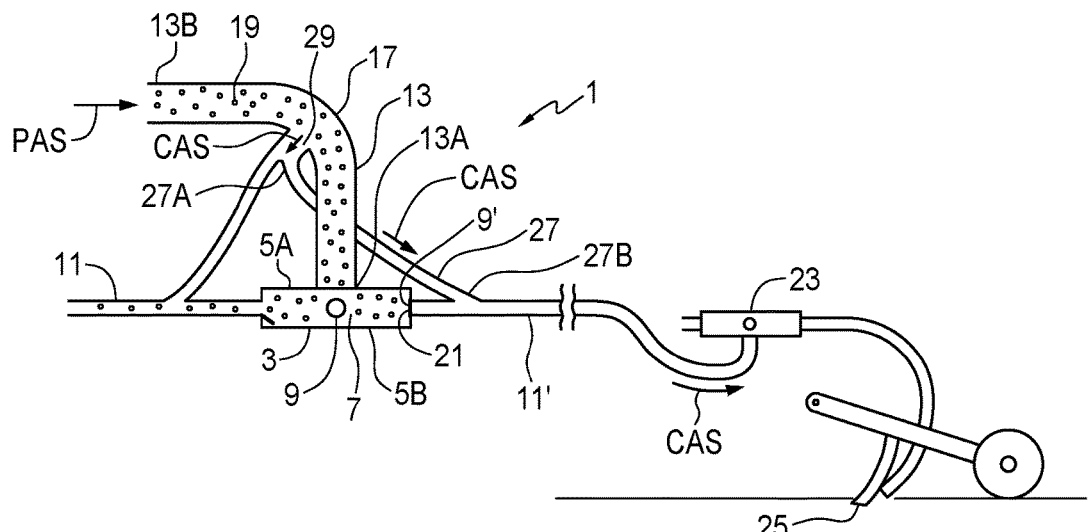
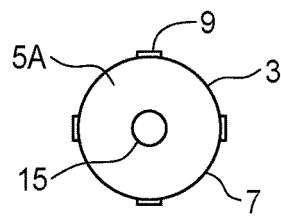 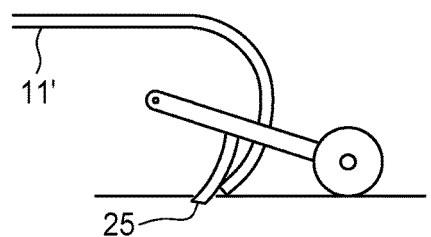
FIG. 3   FIG. 4

AIR SEEDER DISTRIBUTION APPARATUS WITH PURGING AIR

CROSS-REFERENCE TO RELATED APPLICATIONS

This application claims priority to and benefit of CA Serial No. 2,947,428, filed Nov. 4, 2016, the contents of which are incorporated by reference in its entirety and for all purposes.

FIELD OF THE INVENTION

This disclosure relates to the field of agricultural air seeders and in particular an air distribution apparatus with valves on the ports to control product distribution.

BACKGROUND

Agricultural air seeders include generally an implement frame and a plurality of furrow openers spaced across a width of the frame, and movable to a lowered operating position where the furrow openers engage the ground to create furrows as the frame moves along a field. Agricultural products such as seed, fertilizer, and the like are carried in tanks mounted on the frame or a cart pulled with the frame and distributed to the furrow openers by a product distribution system where one or more fans create one or more air streams and metering devices dispense the agricultural products into the air streams and the products are carried through an air distribution network made up of conduits and manifolds to the furrow openers, and then into the furrows. Furrow opener assemblies often create two (or more) separate furrows, such as one furrow for seed and a separate furrow for fertilizer, and separate air streams carrying different agricultural products are connected so as to deposit the different products in the separate furrows. In other air seeders, separate furrow opener assemblies may be used to create the separate furrows.

There are different types of product distribution systems used on present day air seeders. In a Class A product distribution system, all agricultural products destined for a given set of furrows spaced across the width of the implement are metered into a single air stream in a primary supply conduit connected to a primary manifold. Such manifolds are generally a thin cylinder with an inlet in a top or bottom of the cylinder connected to the supply conduit to receive the air stream carrying agricultural products, and a number of outlet ports equally spaced around a circumferential wall. Flat fan manifolds are also known where the supply conduit directs the product air stream into one end of the flat manifold body which divides the product air stream into channels with ports at the ends of the channels on the opposite end of the manifold body. Delivery conduits are connected to each port to carry the air stream further downstream to another manifold or to a furrow opener as the case may be.

In such a Class A product distribution system the primary manifold provides primary division of the air stream and the agricultural products carried therein by dividing and directing the air stream into a number of different delivery conduits, each of which is in turn connected to a secondary manifold. The secondary manifold provides secondary division of the air stream and the agricultural products carried therein by dividing and directing the air stream into a number of different secondary conduits, each of which is connected to a furrow opener to direct the air stream, and the agricultural products carried therein, into a selected furrow.

In a Class B product distribution system the metering device itself is divided into a number of sections such that primary division of the agricultural products takes place prior to the products entering the air stream. Each conduit from a meter section is connected to a manifold which provides secondary division of the air stream and the agricultural products into a number of different secondary conduits, each of which is connected to a furrow opener as in the Class A system.

Present day air seeders are often 80 or more feet wide, and a problem arises when a strip of a field to be seeded is much narrower than the seeder, as a considerable width of the field will be overlapped and seeded twice. It is most undesirable to leave even a narrow strip of a field unseeded as, without crop competition, weeds will flourish in the strip providing seed for future years weed growth. Seeding the adjacent field area twice, however, wastes valuable seed and fertilizer, and the crop on the twice seeded field area generally has reduced yield and/or quality.

Thus it is desirable to provide a means to stop the delivery of agricultural products to furrow openers in the overlap area by providing individual control of the delivery of agricultural products to a number of different sections of furrow openers across the width of the air seeder. U.S. Pat. No. 7,690,440 to Dean et al. discloses a Class B product distribution system where the metering device is divided into a number of sections, and where gates are provided at each meter section that may be opened or closed to start or stop product flow from each meter section. The air seeder is configured so that each meter section supplies agricultural products to a downstream manifold and from there to furrow openers that are laterally arranged in order across a section of the width of the seeder so that stopping product flow to any manifold stops product flow to a section of the air seeder. Thus as the strip of field to be seeded narrows to less than the width of the air seeder, product delivery is stopped to sections of the air seeder passing over previously seeded ground.

U.S. Pat. No. 7,555,990 to Beaujot takes a different approach by providing valves on the outlet ports of the manifold. The described system has a single manifold downstream from the metering device, and valves are provided on each port of the manifold. Each port can thus be opened or closed, such that the delivery of the air stream with the entrained agricultural products to each furrow opener can be stopped or started, however a problem arises when a port is closed and the flow of air through the downstream delivery conduit connected to the furrow opener is shut off. These delivery conduits very often do not slope down all the way from the manifold to the furrow opener, but have low areas where the conduit dips down and then rises. When the manifold ports are blocked, the air is instantly cut off and agricultural products in the downstream conduit are no longer carried along by the air stream but simply fall down, and can thus gather into one of these low areas and block the conduit such that when the port gate is opened again the air stream will not flow through the blocked conduit and the furrow opener will receive no product.

This problem of blocked conduits downstream from a blocked port is addressed by U.S. Pat. No. 8,635,963 to Friggstad by having a two-way valve at each port which can block product flow through the port and simultaneously expose the blocked port to a purging air flow that blows product in the downstream conduit out into the furrow. A plenum of pressurized air is fluidly coupled to the two-way valve to provide the purging air flow to any exit port of the manifold that has been shut off from product flow.

When some of the manifold ports are closed in the systems of Beaujot and Friggstad, the flow of air through the downstream delivery conduits connected to the furrow openers is shut off and the air stream entering the manifold then must flow out through the open ports such that an increased amount of air flows out each of the open ports. As the number of closed ports increases, more and more air tries to flow through the open ports and back pressure in the manifold increases. With the fans most commonly used in air seeders to generate the air streams used for distributing agricultural products through conduits, as the back pressure in the conduits increases, the volume of air moved decreases, and the velocity of the moving air decreases.

Thus, in the system of Beaujot, as back pressure in the manifold increases, the volume of the air stream entering the manifold is reduced, and the velocity of the air flowing through the supply conduit feeding the manifold is reduced. The air stream must move through the supply conduit at a minimum velocity that is sufficient to keep the agricultural products entrained in the air stream suspended therein. This critical velocity will be higher in a vertical section of the supply conduit than in a horizontal section, as the air stream must move the agricultural products upward against the force of gravity as opposed to moving the product laterally.

If the velocity drops below this "critical" velocity, the particles of agricultural product will drop out of the air stream. Thus, in the Beaujot and Friggstad systems, as ports are closed the velocity of the air stream will at some point fall below the critical velocity, the agricultural products will start to drop out of the air stream, and lay in the bottom of the supply conduit.

U.S. Pat. No. 8,690,488 to Jagow et al. addresses this problem. In Jagow when the port valve is closed to block product flow, an exhaust valve on the supply conduit is opened to exhaust a flow of air similar to that blocked when the port valve is closed. The Jagow system thereby keeps substantially the same amount of air flowing through the supply conduit which addresses the air flow problems present with the Beaujot and Friggstad systems. In one version the exhaust air is directed through a two-way valve which either opens the port to allow product flow into the downstream conduit while blocking the exhaust air flow, or blocks the port to stop product flow while opening the exhaust and directing the exhaust air into the downstream conduit to purge the downstream conduit of product, similar to the system of Friggstad.

SUMMARY OF THE INVENTION

The present disclosure provides an air distribution apparatus for an air seeder that overcomes problems in the prior art.

The present disclosure provides an air distribution apparatus for an air seeder. The apparatus comprises a manifold body, and a plurality of ports defined through a wall of the manifold body, and a delivery conduit is connected at an input end thereof to each port. A supply conduit is connected at an output end thereof to an interior of the manifold body, and connected at an input end thereof to receive a product air stream with agricultural products entrained therein. On at least a first port, a port valve is configured such that when the port valve is open, a corresponding first delivery conduit is connected to an interior of the manifold body through the first port and a first portion of the product air stream flows through the first delivery conduit, and such that when the port valve is closed, the first delivery conduit is disconnected from the interior of the manifold body. A purging conduit is connected at an input end thereof to the supply conduit at a clean air location configured to receive from the supply conduit a clean air stream with substantially no agricultural products entrained therein, and connected at an output end thereof to the first delivery conduit in proximity to the first port such that the clean air stream has an open path from the supply conduit to the first delivery conduit. When the port valve is open the clean air stream flows through the purging conduit at a first flow rate, and when the port valve is closed the clean air stream flows through the purging conduit at a second flow rate that is greater than the first flow rate.

The present invention maintains air speed of the product air stream above a critical velocity in the distribution network as ports are closed and opened, and provides a purging clean air stream to clear agricultural products from delivery conduits and manifolds downstream of a closed port valve. The present apparatus is simple and less costly to make compared to the prior art system where a two way valve with appropriate controls is required to simultaneously open the purging air conduit while closing the port valve.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic cut-away side view of an embodiment of the air distribution apparatus of the present disclosure with the first port valve open;

FIG. 2 is a schematic cut-away side view of the embodiment of FIG. 1 with the first port valve closed;

FIG. 3 is a schematic top view of the manifold body of the embodiment of FIG. 1;

FIG. 4 is a schematic side view showing the first delivery conduit connected directly to a furrow opener.

DETAILED DESCRIPTION OF THE ILLUSTRATED EMBODIMENTS

FIGS. 1 and 2 schematically illustrate an embodiment of an air distribution apparatus 1 of the present disclosure. The apparatus 1 is shown as part of an air seeder product distribution network. The apparatus 1 comprises a manifold body 3 comprising substantially circular top and bottom plates 5, as illustrated in FIG. 3, oriented substantially horizontally, and a substantially vertical body wall 7 extending between the top and bottom plates 5A, 5B. Ports 9 are defined through the body wall 7, and a delivery conduit 11 is connected at an input end thereof to each port 9.

A substantially vertically oriented supply conduit 13 is connected at an output end 13A thereof to the interior of the manifold body 3 through an aperture 15 in the top plate 5A. The supply conduit 13 extends substantially vertically up from the manifold body 3 to a curved elbow 17 and then extends substantially horizontally from the elbow 17 to an input end 13B thereof that is connected to receive a product air stream PAS with agricultural products 19 entrained therein. The product air stream PAS is provided by a conventional air seeder fan and metering system.

A port valve 21 is configured such that when the port valve 21 is open, as shown in FIG. 1, the corresponding first conduit 11' is connected to the interior of the manifold body 3 through a first port 9' and a first portion PAS' of the product air stream PAS flows through the first delivery conduit 11' to a downstream secondary manifold 23 which divides the first portion PAS' of the product air stream PAS into separate air streams to each of a plurality of furrow openers 25 as is known in the art. The first portion PAS' of the product air stream PAS will be a proportion of the total product air stream PAS substantially corresponding to the number of ports 9.

When the port valve 21 is closed, as shown in FIG. 2, the first delivery conduit 11' is disconnected from the interior of the manifold body 3 and no part of the product air stream enters the first delivery conduit 11'. The air seeder system will typically be configured to correspondingly reduce the amount of entrained agricultural products in the product air stream PAS to maintain a constant application rate of agricultural products across the width of the air seeder.

A purging conduit 27 is connected at an input end 27A thereof to the supply conduit 13 at a clean air location 29 configured to receive from the supply conduit 13 a clean air stream CAS with substantially no agricultural products entrained therein. In the illustrated apparatus the clean air location 29 is at an inner radius of the elbow 17. The velocity of the product air stream PAS causes the agricultural products to follow the outer radius of the elbow 17 when turning from the horizontal to the vertical direction, such that little if any product is present at the inner radius, and a clean air supply can be obtained.

The purging conduit 27 is connected at an output end 27B thereof to the first delivery conduit 11' somewhere in general proximity to the first port 9' such that the clean air stream CAS has an open path from the supply conduit 13 to the first delivery conduit 11'.

When the port valve 21 is open as in FIG. 1, the air pressure of the first portion PAS' of the product air stream PAS is present at the output end 27B of the purging conduit 27, which pressure is only slightly less than the air pressure of the product air stream PAS at the clean air location 29. The pressure difference is due to pressure losses as the product air stream PAS passes through the manifold body 3 and port 9', but in any event the pressure differential is small and the clean air stream CAS flows through the purging conduit 27, and then through the first delivery conduit 11' with the first portion PAS' of the product air stream PAS, at a first flow rate that is virtually negligible for the purposes of the apparatus 1 and does not adversely affect air flows in the apparatus 1.

When the port valve 21 is closed, the air pressure of the first portion PAS' of the product air stream PAS is removed from the output end 27B of the purging conduit 27 and the air pressure of the product air stream PAS at the clean air location 29 causes the clean air stream CAS to flow through the purging conduit 27 and the first delivery conduit 11' at a second flow rate that is much greater than the first flow rate, and comparable to the rate of air flow in the first portion PAS' of the product flow rate PAS since the air pressure at the output end 27B of the purging conduit is then about the same as at the clean air location 29, which as described above is very close to the air pressure of the first portion PAS' of the product air stream PAS when the port valve 21 is open.

Thus the air flow through the supply conduit 13 remains substantially the same whether the port valve 21 is open or closed, and problems of reduced air flow in the supply conduit 13 are avoided.

FIG. 4 schematically illustrates an alternate arrangement where the first delivery conduit 11' is connected at an output end thereof directly to a furrow opener 25 which may in some cases be preferred in order to stop and start the flow of agricultural products to each furrow opener 25 independently.

The present invention thus maintains air speed of the product air stream PAS above a critical velocity in the distribution network as ports 9 are closed and opened, and provides a purging clean air stream CAS to clear agricultural products 19 from delivery conduits 11 and manifolds 23 downstream of a closed port valve 21. The present apparatus 1 is simple and less costly to make compared to the prior art system where a two way valve with appropriate controls is required to simultaneously open the purging air conduit while closing the port valve. In the present apparatus 1 only a simple on/off port valve 21, with appropriate simple controls is required. The purging air flow is constantly present and the flow rate thereof increases to purge the delivery conduits 11 when the corresponding port valves 21 close, and drops to a negligible amount when the port valves 21 open.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An air distribution apparatus for an air seeder, the apparatus comprising:

a manifold body, and a plurality of ports defined through a wall of the manifold body;

a delivery conduit connected at an input end thereof to each port;

a supply conduit connected at an output end thereof to an interior of the manifold body, and connected at an input end thereof to receive a product air stream with agricultural products entrained therein;

on at least a first port, a port valve configured such that when the port valve is open, a corresponding first delivery conduit is connected to an interior of the manifold body through the first port and a first portion of the product air stream flows through the first delivery conduit, and such that when the port valve is closed, the first delivery conduit is disconnected from the interior of the manifold body;

a purging conduit connected at an input end thereof to the supply conduit at a clean air location configured to receive from the supply conduit a clean air stream with substantially no agricultural products entrained therein, and connected at an output end thereof to the first delivery conduit in proximity to the first port such that the clean air stream has an always open path from the supply conduit to the first delivery conduit; and wherein while the port valve is open the clean air stream flows through the purging conduit at a first flow rate, and while the port valve is closed the clean air stream flows through the purging conduit at a second flow rate that is greater than the first flow rate.

2. The apparatus of claim 1 wherein the supply conduit extends substantially vertically up from the manifold body to a curved elbow and then extends substantially horizontally from the elbow, and wherein the clean air location is at an inner radius of the elbow.

3. The apparatus of claim 1 wherein the first delivery conduit is connected at an output end thereof to a secondary manifold.

4. The apparatus of claim 1 wherein the first delivery conduit is connected at an output end thereof to a furrow opener.

\* \* \* \* \*